United States Patent [19]

Moon

[11] Patent Number: 4,985,721

[45] Date of Patent: Jan. 15, 1991

[54] FILM CHANGE BAG

[75] Inventor: Byungmoon Moon, Seoul, Rep. of Korea

[73] Assignee: New Tech Co., Ltd., Seoul, Rep. of Korea

[21] Appl. No.: 384,734

[22] Filed: Jul. 24, 1989

[30] Foreign Application Priority Data

Jul. 23, 1988 [KR] Rep. of Korea .............. 88-11885[U]
Jun. 9, 1989 [KR] Rep. of Korea ................ 89-7992[U]

[51] Int. Cl.$^{5}$ .............................................. G03B 17/56

[52] U.S. Cl. .................................... 354/308; 383/119; 190/107; 190/127

[58] Field of Search .................. 206/316.1, 316.2, 525; 383/2, 33, 34, 41, 104, 34.1, 119; 190/107, 112, 122, 123, 127; 354/308

[56] References Cited

U.S. PATENT DOCUMENTS

| | | | |
|---|---|---|---|
| D. 302,170 | 7/1989 | Harrison | 354/308 |
| 749,876 | 1/1904 | McCormick | 383/34.1 |
| 782,047 | 2/1905 | Pearson | 190/112 |
| 1,199,979 | 10/1916 | Garst | 383/34 |
| 1,670,026 | 5/1928 | De Lano | 354/308 |
| 1,670,709 | 5/1928 | Blood | 383/104 |
| 1,902,313 | 3/1933 | Struble | 383/104 |
| 2,016,520 | 10/1935 | Short | 206/289 |
| 2,025,101 | 12/1935 | Halpin | 190/119 |
| 2,170,379 | 8/1939 | Ortt | 190/112 |
| 2,429,856 | 10/1947 | Vasquez | 383/38 |
| 2,487,506 | 11/1949 | Zaleski | 354/308 |
| 2,710,084 | 6/1955 | Braverman | 190/127 |
| 2,751,952 | 6/1956 | Mirus | 383/41 |
| 2,804,899 | 9/1957 | Beattie | 383/33 |
| 2,806,563 | 9/1957 | Einhorn | 190/107 |
| 3,014,516 | 12/1961 | Mueller | 383/119 |
| 3,060,819 | 10/1962 | Tohill | 354/308 |
| 3,105,617 | 10/1963 | Felldin | 383/41 |
| 4,006,928 | 2/1977 | Beugin | 383/33 |
| 4,248,364 | 2/1981 | Anderson | 383/104 |
| 4,561,480 | 12/1985 | Underwood et al. | 383/34 |
| 4,731,627 | 3/1988 | Chisholm | 354/308 |
| 4,815,866 | 3/1989 | Martone | 383/34.1 |

FOREIGN PATENT DOCUMENTS

| | | | |
|---|---|---|---|
| 1150742 | 4/1969 | United Kingdom | 383/34 |

*Primary Examiner*—David T. Fidei
*Attorney, Agent, or Firm*—Christie, Parker & Hale

[57] ABSTRACT

The film change bag has an opaque fabric or plastic bag through which a user may put his hands and an opening through which a camera or the like may be inserted. When in use, the bag is maintained in an expanded state by a continuous loop elastic frame inside the bag. The loop is twisted in a way to have a center loop and a pair of end loops essentially touching each other. At the two points where the larger loop crosses itself to form the smaller loops, there are hinge points. The normal state of the frame is with the three loops approximately copolanar for folding the bag. The bag is erected by twisting the elastic loop at the hinge points so that the end loops are roughly normal to the center loop. The elasticity of the loop tends to return it to the folded state. The edges of the end loops remote from the hinge points are therefore connected together by a spring latch for holding the edges a selected distance apart and keeping the frame erect.

17 Claims, 6 Drawing Sheets

FILM CHANGE BAG

BACKGROUND OF THE INVENTION

The present invention relates to a film change bag and, more particularly to a film change bag suitable for changing film in medium size and/or large size cameras and comfortable to carry.

Conventionally, this kind of film change bag is made of cloth and/or vinyl materials, and constitutes shading bag having two inlets.

Using the bag, a camera which has a film therein is put into the bag, and the user put their hands into the bag through the inlets and change the film therein.

This kind of film change bag is used outdoors, and therefore the bag must be comfortable to carry and suitable for all kinds of cameras, regardless sizes thereof.

However, since the bag comprised of a shading bag made of cloth and/or vinyl materials, the bag is not suitable for changing large size film of 4×5 and/or 6×6 which is simply covered by shading papers and used for medium and/or large size cameras, although the bag is usable for changing regular film for 35 mm camera which was packed in a cassette.

Furthermore, the conventional film change bag simply comprises of shading bag having nothing therein, and therefore it was inconvenient to handle the camera therein since the bag was flattened.

In order to solve the aforementioned problems, it was proposed to equip a frame inside the bag, which support the bag to desired shape.

However, equipping the frame inside the bag, the bag is hard to fold and therefore inconvenient to carry.

BRIEF SUMMARY OF THE INVENTION

Accordingly, it is a primary object of the invention to provide an improved film change bag which is convenient to carry.

Another object of the invention is to provide a film change bag which is suitable to be used to change a medium and/or a large size camera film, and be kept unfolding state as comfortable to carry.

Still another object of the invention is to provide a film change bag which has enough space inside thereof, and therefore convenient to handle a camera therein.

In order to achieve abovementioned objects, the present invention provides a film change bag being constituted of foldable frame installed in a shading bag.

According to the present invention, the frame is a single endless loop formed in shape of "three side-by-side touching loops", by bending and twisting metal or synthetic resin strip, so that the frame constitutes three annular rims and form an uniform frame to support the shading bag by self-elasticity when it is unfolded.

On the other hand, the frame includes a locking member to keep the frame at unfolded state.

According to an aspect of the present invention, the locking member is consisted of a latch installed on one end of the frame, and a fixing means provided on the other end of the frame in order to support the said latch.

The above and other related objects and features of the invention will be apparent from a reading of the following description of the disclosure found in the accompanying drawings and the novelty thereof pointed out in the appended claims.

BRIEF DESCRIPTION OF THE DRAWINGS

Now, the present invention is described more in details referring the accompanying drawings in which.

DETAILED DESCRIPTION OF THE INVENTION

Figure 1:
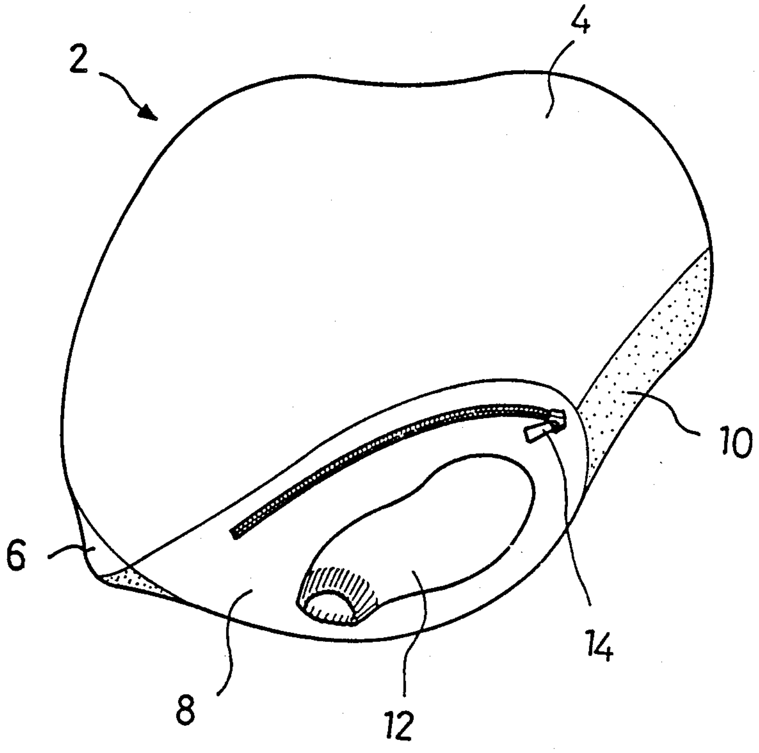
FIG. 1 is an apparent perspective view of a film change bag according to a preferred embodiment of the present invention.
Figure 2:
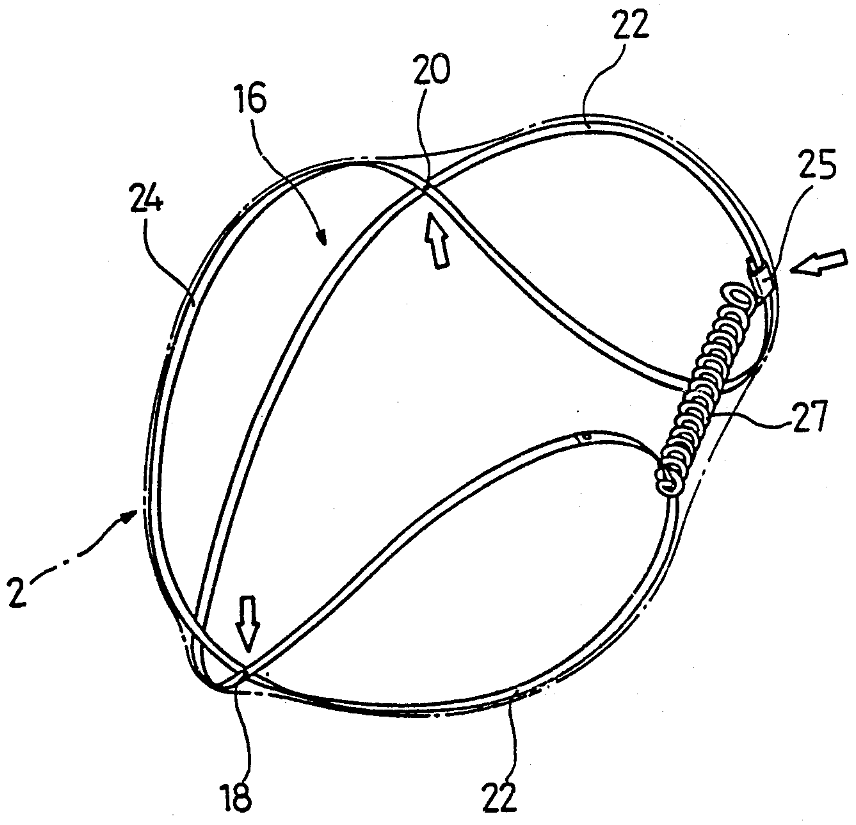
FIG. 2 is a perspective view of the first embodiment of a frame installed in the film change bag, according to the present invention.

Referring first to FIG. 1 and FIG. 2, the film change bag comprises a shading bag (2) containing a frame (16) therein. The shading bag (2) may be made by sewing or bonding top part (4), rear part (6), side part (8) and bottom part (8) in a bag shape. The outside of those parts are coated in silver color so that it may reflect the light. On each of the side parts (8), there are provided inlet (12) respectively, and the user of the bag may put his hands into the bag therethrough. A slider fastener (14) is installed on one of the side part (8). The user may open the fastener (14) and put a camera or a developing tank into the bag.

FIG. 2 shows a perspective view of inner structure of the film change bag shown in FIG. 1, which constitutes a frame (16). The frame (16) is formed in shape of "three side-by-side touching loops" by bending and twisting a strip made of synthetic resin or metal.

Cross points (18),(20) are linked by fixing members respectively, and thereby the frame constitutes 3 annular rims.

Side rim (22),(22) supports the side parts (8),(8) of the shading bag (2) while the centre rim (24) supports the rear part (6) of the bag (2).

In order to retain those rims (22),(24),(22) unfolded, it is required to equip a locking means.

Figure 3:
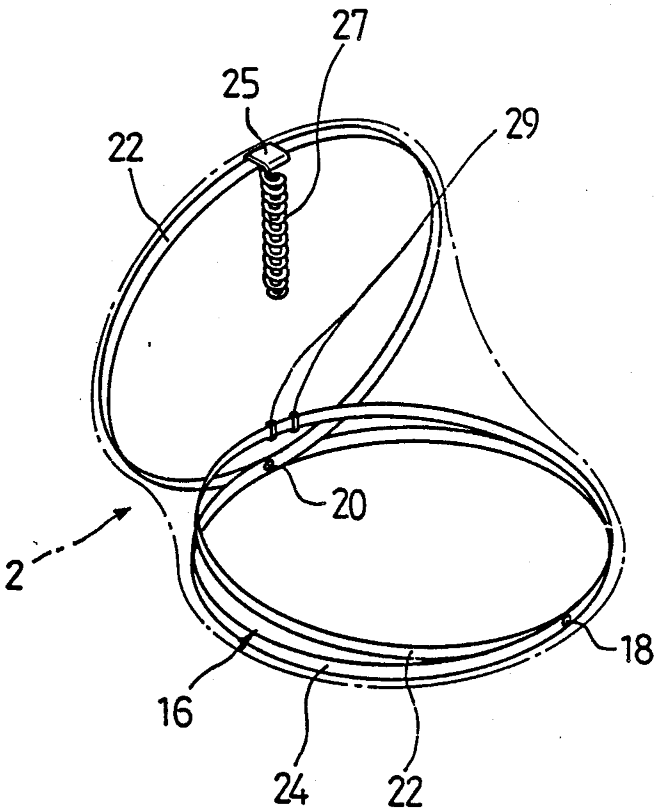
FIG. 3 is a perspective view of the frame shown in FIG. 2 at folded state.

In a preferred embodiment shown in FIG. 2, the locking means comprises a spring latch (27) having a bracket (25) installed on one of the side rim (22) and fixing means (29) provided on the other side rim (22) (see FIG. 3).

In this embodiment, the latch (27) is constituted a spring which has elasticity, not only in longitudinal direction but also in transverse direction.

The fixing means (29) is provided to protect moving of the latch (27) on the rim (22).

In order to prevent moving of the frame (16) in the shading bag (2), cross points (18),(20) and bracket (26) which are pointed by arrows in FIG. 2, may be sewn on the shading bag.

If necessary, some other points also can be sewn on the shading bag for better fixing of the frame onto the bag.

Now, the operation of the film change bag is described in details. At the first stage, the shading bag was flattened, because the frame (16) was kept at folded state.

In this state, the user put his hands into the bag through 2 inlets (12).

Now, the user may pull the rims (22), (24) and expand them into unfolded state. Then the rim is unfolded as the state shown in FIG. 2, and those rims (22),(24) support relevant parts (6),(8).

Then the bag is expanded, and provides space inside thereof.

Now, the user opens the fastener (14) and put his camera and/or developing tank into the bag through the openings of the fastener (14).

Then the user closes the fastener (14), and put his hands into the bag through the inlets (12). Then the user is able to change film.

Figure 4:
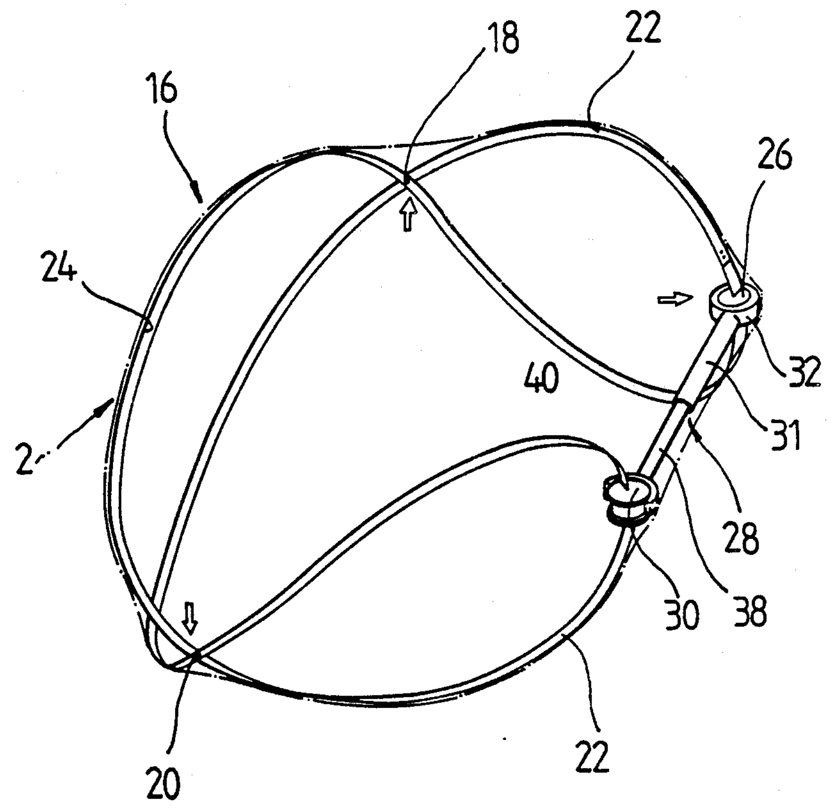
FIG. 4 is a perspective view of the second embodiment of a frame installed in the film change bag according to the present invention.

In FIG. 4, there is shown another embodiment of the locking means, and with reference to FIG. 4, in which parts similar to those previously described to FIGS. 2 and 3 are denoted by the same numerals.

Also, in this embodiment, the frame (16) has same constitution as is shown in FIG. 2, but only the locking means has different constitution.

In the embodiment shown in FIG. 4, the locking means comprises a latch (28) which is installed on one of the side rim (22) through bracket (26) and fixing means (30) installed on the other side rim (22).

Figure 5:
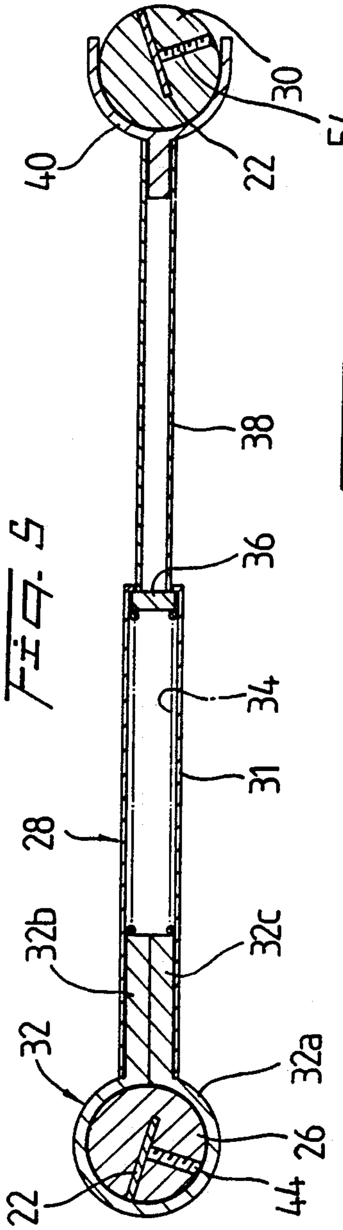
FIG. 5 is a cross-sectional view of the latch shown in FIG. 4.

As is shown in FIG. 5, the latch (28) comprises a cylinder (31) having a hinge (32) at its one end, and piston rod (38) having a fork (40) at its one end and is installed into the cylinder (31) through piston (36).

Inside the cylinder (31), there is provided a spring (34), with which the piston (36) is supported.

The hinge (32) is consisted of an annular hinge axis inserting port (32*a*) and fixing rods (32*b*), (32*c*) which are extended from the port (32*a*) and cut into half for providing a space therebetween.

Figure 6:
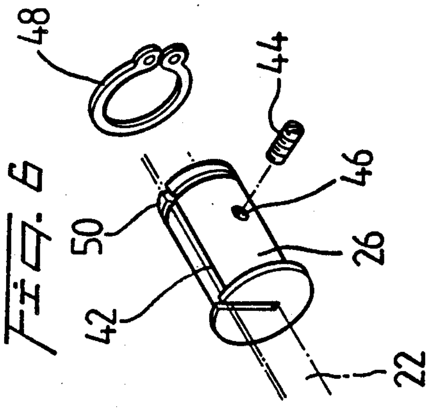
FIG. 6 is an exploded perspective view of a hinge axis shown in FIG. 5.
Figure 8:
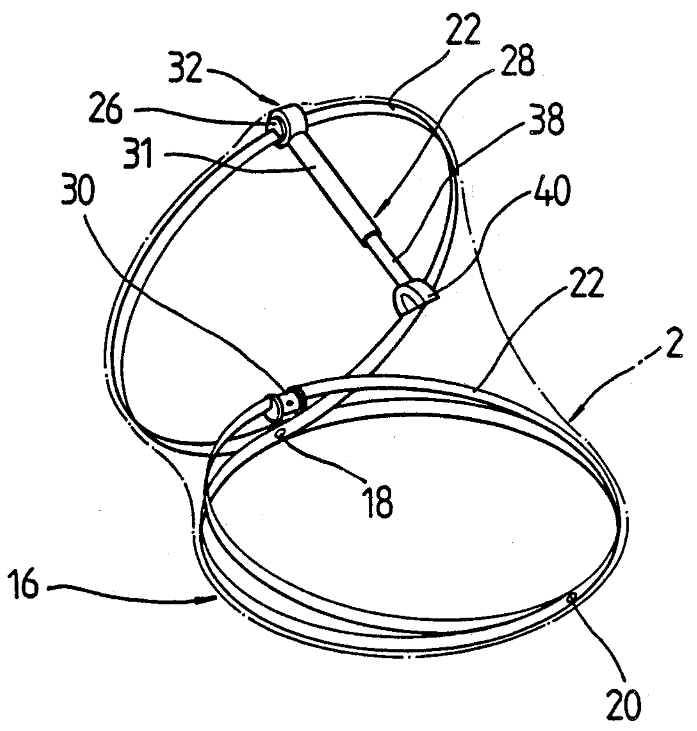
FIG. 8 is a perspective view of the frame shown in FIG. 5 at folded state.

FIG. 6 show a perspective view of a bracket (26) consisting of a recess (42) which is formed with almost the same depth as support strip (22), a thread hold (46) into which a set screw (44) is fitted, and an annular recess (50) whereto the ring (48) is inserted at the end of the bracket (26).

Figure 7:
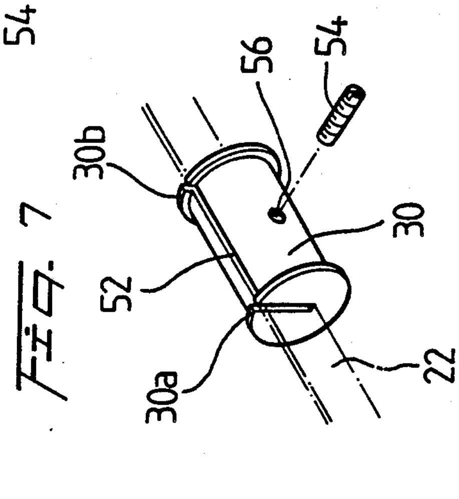
FIG. 7 is an exploded perspective view of a fork support axis shown in FIG. 5.

FIG. 7 shows perspective view of a fixing means (30) which is consisted of flanges (30*a*), (30*b*) provided at each end thereof, a recess (52) formed in longitudinal direction with almost the same depth as the width of said support strip (22), and thread hold (56) into which a set screw (54) is fitted.

When assembling the frame (16) of the film change bag according to the aforementioned embodiment, at first, one of both side strips (22), may be inserted into the recess (42) of the fixing means (26) as shown in FIG. 6.

Then a set screw (44) is fitted into the thread hole (46) and thereby, the front end of the set screw (44) fix the support strip (22) onto the inner surface of the recess (42).

After that, fixing rods (32*b*)(32*c*) of the hinge (32) are pulled into opposite direction each other so that the space is formed therebetween, and insert the support strip (22) therein. When the support strip (22) is placed inside the hinge axis inserting port (32*a*), the hinge axis inserting port (32*a*) is inserted out of the hinge axis (26) and put the ring (48) into the ring recess (50).

After that, the fixing means (30) is placed on the predetermined portion of the other support strip (22) through the recess (52), and the strip (22) is fixed by set screw (54). ALso in this embodiment, in order to prevent moving of the frame (16) in the shading bag (2), cross points (18),(20) and the bracket (26) which are indicated by arrows as shown in FIG. 2, may be sewn on the shading bag, as like the first embodiment.

And, if necessary, it is possible to fix some other points onto the shading bag (2).

The operation of the film change bag according to this embodiment is almost identical with the operation of the bag according to the first embodiment. And therefore the detailed explanation thereof is omitted.

While the present invention has been particularly shown and described with reference to preferred embodiments thereof, it should be understood that various modifications, variations and other changes may be made by those skilled in the art without departing from the spirit of the invention.

The scope of the invention is therefore to be determined solely by the appended claims.

What is claimed is:

1. A film change bag comprising:
 a bag made of opaque flexible sheet material and having two inlets through which a user may put his hands into the bag;
 an elastically deformable frame means in the bag having side rims for folding between a folded state where the frame is flat and an unfolded state where the frame is in the form of three side-by-side loops which are not in parallel planes; and
 locking means for keeping the frame means in the unfolded state, said locking means comprising:
  spring latch means for elastically keeping the side rims apart;
  bracket means on one side rim for mounting the latch means, and
  fixing means on another side rim for receiving the latch.

2. A film change bag comprising:
 a bag made of opaque flexible sheet material and having two inlets through which a user may put his hands into the bag;
 one piece frame means in the bag having side rims for folding between a folded state where the frame is flat and an unfolded state where the frame is three dimensional; and
 locking means for keeping the frame means in the unfolded state, said locking means comprising:
  latch means for keeping the side rims apart,
  bracket means on one side rim for mounting the latch means, and
  fixing means on another side rim for receiving the latch.

3. A film change bag comprising:
 a bag made of opaque flexible sheet material and having two inlets through which a user may put his hands into the bag;
 frame means in the bag having side rims for folding between a folded state where the frame is flat and an unfolded state where the frame is three dimensional; and
 locking means for keeping the frame means in the unfolded state, said locking means comprising:
  latch means for keeping the side rims apart;
  bracket means on one side rim for mounting the latch means, and fixing means on another side rim for receiving the latch; and wherein the latch means comprises:
a cylinder,
a hinge at one end of the latch means,
a piston in the cylinder,
a piston rod on the piston, and
a fork at the other end of the latch means.

4. A film change bag as recited in claim 3 wherein the hinge is connected to the bracket on one side rim, and the fork engages the fixing means on the other side rim.

5. A film change bag comprising:
a bag of flexible material;
an opening in the bag through which one may insert an object and which is closable to be light-tight;
a pair of opposed openings in the bag through which a user may put his hands for manipulating film or the like;
a one piece continuous loop elastic frame within the bag having a pair of hinge points dividing the loop into three loops, the three loops each torsionally twisting when the side loops are rotated relative to the center loop between a flat condition where all three loops are in approximately a single plane and an unfolded three dimensional condition where the two side loops are at a large angle relative to the center loop.

6. A film change bag as recited in claim 5 wherein the frame comprises a center loop and a pair of end loops hinged together edge to edge.

7. A film change bag as recited in claim 6 further comprising a latch between edges of the end loops for holding the edges a selected distance apart.

8. A film change bag as recited in claim 5 wherein the frame comprises a continuous elastic ribbon having hinge points at each of two crossings of the ribbon to form three interconnected loops of approximately equal diameter.

9. A film change bag as recited in claim 8 further comprising a latch between edges of the outermost interconnected loops for holding the edges a selected distance apart.

10. A film change bag as recited in claim 9 wherein the latch comprises a coil spring extending between the edges of the loops.

11. A film change bag as recited in claim 10 wherein the spring is encompassed in a cylindrical housing connectable to one loop, and the latch further comprising a piston engaging the spring and having an end extending from the cylindrical housing and connectable to another loop.

12. A film change bag as recited in claim 5 wherein the frame comprises a continuous elastic ribbon, hinge pins between segments of the ribbon for pivoting adjacent segments of the ribbon relative to each other.

13. A film change bag comprising:
a bag of flexible material;
an opening in the bag through which one may insert an object and which is closable to be light-tight;
a pair of opposed openings in the bag through which a user may put his hands for manipulating film or the like;
an endless loop of elastic ribbon within the bag; and
hinge pins between segments of the ribbon dividing the ribbon into three edge-to-edge smaller endless loops for pivoting of adjacent looped segments of the ribbon relative to each other between a folded position where the smaller loops are approximately in a single plane and an unfolded condition where none of the three smaller loops are in a single plane so that each of the smaller loops torsionally twists when moved between the folded and unfolded positions.

14. A film change bag as recited in claim 13 further comprising a spring latch connectable between opposite loops when the ribbon is in it unfolded state.

15. A film change bag as recited in claim 13 further comprising a latch between edges of the outermost interconnected loops for holding the edges a selected distance apart.

16. A film change bag as recited in claim 15 wherein the latch comprises a coil spring extending between the edges of the loops.

17. A film change bag as recited in claim 15 wherein the spring in encompassed in a cylindrical housing connectable to one loop, and the latch further comprising a piston engaging the spring and having an end extending from the cylindrical housing and connectable to another loop.

* * * * *